(12) United States Patent
Liu

(10) Patent No.: US 10,257,481 B2
(45) Date of Patent: *Apr. 9, 2019

(54) METHOD AND SYSTEM FOR ADJUSTING A PROJECTED IMAGE, AND PROJECTION DEVICE

(71) Applicants: Hisense Co., Ltd., Qingdao (CN); HISENSE USA CORPORATION, Suwanee, GA (US); HISENSE INTERNATIONAL CO., LTD., Qingdao (CN)

(72) Inventor: Jie Liu, Qingdao (CN)

(73) Assignees: Hisense Co., Ltd., Qingdao (CN); Hisense USA Corporation, Suwanee, GA (US); Hisense International Co., Ltd., Qingdao (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/785,031

(22) Filed: Oct. 16, 2017

(65) Prior Publication Data

US 2018/0041741 A1 Feb. 8, 2018

Related U.S. Application Data

(63) Continuation of application No. 15/173,269, filed on Jun. 3, 2016, now Pat. No. 9,819,921.

(30) Foreign Application Priority Data

Aug. 19, 2015 (CN) .......................... 2015 1 0512957

(51) Int. Cl.
*H04N 9/31* (2006.01)

(52) U.S. Cl.
CPC ......... *H04N 9/3185* (2013.01); *H04N 9/3194* (2013.01)

(58) Field of Classification Search
CPC .......................... H04N 9/3185; H04N 9/3194
(Continued)

(56) References Cited

U.S. PATENT DOCUMENTS

| | | | | |
|---|---|---|---|---|
| 6,057,881 A * | 5/2000 | Kawashima | ............. | H04N 9/31 348/181 |
| 6,100,926 A * | 8/2000 | Kawashima | ............. | H04N 9/28 348/181 |

(Continued)

*Primary Examiner* — Brian P Yenke
(74) *Attorney, Agent, or Firm* — Harness, Dickey & Pierce, P.L.C.

(57) ABSTRACT

The disclosure relates to the field of electronic devices and particularly to a method and device for adjusting a projected image so as to adjust the problem of time-consuming and inaccurate manual adjustment of the image in the existing method for adjusting a projected image. The method according to an embodiment of the disclosure includes: transmitting, by a projection device, to each zone in a projection range, positional information corresponding to the zone; receiving, by the projection device, position identifiers, transmitted by recognition devices located in space round a projection screen, the position identifiers determined by the recognition devices according to the positional information transmitted by the projection device; and adjusting, by the projection device, the projection range according to the position identifiers transmitted by the recognition devices.

15 Claims, 7 Drawing Sheets

(58) Field of Classification Search
USPC ....... 348/744, 725, 723, 785, 706, 608, 636,
348/657, 678, 680, 693, 697, 564, 569,
348/333.1, 277, 177, 175, 164, 141, 139,
348/136, 116, 107, 33; 345/157, 158,
345/593; 353/28, 30, 98
See application file for complete search history.

(56) References Cited

U.S. PATENT DOCUMENTS

| | | | |
|---|---|---|---|
| 6,292,171 B1* | 9/2001 | Fu | G06F 3/0386 345/156 |
| 6,678,009 B2* | 1/2004 | Kahn | H04N 5/21 348/569 |
| 7,061,552 B1* | 6/2006 | Patten | H04N 3/227 345/660 |
| 7,667,734 B2* | 2/2010 | Uehara | H04N 17/045 348/177 |
| 8,089,567 B2* | 1/2012 | Chung | H04N 5/74 348/460 |
| 9,004,698 B2* | 4/2015 | Kilcher | G01S 7/4814 353/69 |
| 9,462,239 B2* | 10/2016 | Liu | H04N 9/3105 |
| 9,551,918 B2* | 1/2017 | Ouchi | H04N 9/3185 |
| 9,565,408 B2* | 2/2017 | Shinozaki | H04N 9/3185 |
| 9,686,447 B2* | 6/2017 | Komiyama | H04N 5/05 |
| 9,769,509 B2* | 9/2017 | Ozaki | H04N 21/25825 |
| 9,787,960 B2* | 10/2017 | Sumiyoshi | H04N 9/3185 |
| 2003/0011535 A1* | 1/2003 | Kikuchi | G06T 15/10 345/6 |
| 2005/0213846 A1* | 9/2005 | Matsuda | G03B 21/14 382/275 |
| 2007/0182937 A1* | 8/2007 | Cheng | G03B 21/28 353/74 |
| 2008/0266321 A1* | 10/2008 | Aufranc | G03B 21/26 345/626 |
| 2009/0085828 A1* | 4/2009 | Lee | G06F 3/0488 345/1.1 |
| 2009/0244492 A1* | 10/2009 | Perkins | G03B 21/10 353/69 |
| 2010/0026722 A1* | 2/2010 | Kondo | G09G 3/2007 345/660 |
| 2010/0103330 A1* | 4/2010 | Morrison | G06F 3/0412 348/744 |
| 2010/0110387 A1* | 5/2010 | Wendt | H04N 9/3194 353/29 |
| 2011/0205186 A1* | 8/2011 | Newton | G06F 3/011 345/175 |
| 2011/0321111 A1* | 12/2011 | Chae | H04N 9/3147 725/117 |
| 2012/0105816 A1* | 5/2012 | Ozawa | G03B 21/006 353/85 |
| 2013/0106908 A1* | 5/2013 | Ichieda | G09G 3/02 345/629 |
| 2013/0222386 A1* | 8/2013 | Tannhauser | G06T 11/60 345/428 |
| 2013/0286255 A1* | 10/2013 | Suzuki | H04N 5/2621 348/239 |
| 2013/0329013 A1* | 12/2013 | Metois | G01B 11/00 348/46 |
| 2014/0028553 A1* | 1/2014 | Harland | G06F 3/0304 345/158 |
| 2014/0071099 A1* | 3/2014 | Kubota | G09G 5/006 345/179 |
| 2014/0253433 A1* | 9/2014 | Sato | G06F 3/017 345/156 |
| 2014/0313104 A1* | 10/2014 | Ono | H04N 9/3179 345/2.3 |
| 2015/0015852 A1* | 1/2015 | Furui | H04N 9/3194 353/69 |
| 2016/0004337 A1* | 1/2016 | Nagao | G06F 3/0425 345/158 |
| 2016/0198136 A1* | 7/2016 | Brown | H04N 5/74 348/746 |
| 2016/0255315 A1* | 9/2016 | Lin | H04N 9/3179 348/189 |
| 2017/0142382 A1* | 5/2017 | Nishioka | G06F 3/0488 |
| 2017/0285452 A1* | 10/2017 | Miura | G03B 21/208 |

* cited by examiner

US 10,257,481 B2

METHOD AND SYSTEM FOR ADJUSTING A PROJECTED IMAGE, AND PROJECTION DEVICE

CROSS-REFERENCE TO RELATED APPLICATIONS

This application a continuation of U.S. patent application Ser. No. 15/173,269 filed Jun. 3, 2016, which claims the benefit and priority of Chinese Patent Application No. 201510512957.9 filed Aug. 19, 2015. The entire disclosures of each of the above applications are incorporated herein by reference.

FIELD

The present disclosure relates to the field of electronic devices.

BACKGROUND

This section provides background information related to the present disclosure which is not necessarily prior art.

A projection device is a device which can project an image or a video and which can display a picture with a large size. The projection device is typically used in cooperation with a projection screen to improve the resolution of the displayed image and to enrich the colors of the displayed image for a better display effect. The projection device in real use needs to be adjusted so that the image projected by the projection device overlaps with a projection screen.

Earlier projection device were not difficult to adjust because the legacy projection devices required a large projection distance and were typically deployed at a meeting room or other similar places where the projection devices were frequently fixed on walls or other immobile positions. The projection devices were fixed in position so that it was convenient for human operators to adapt images projected by the projection device to projection screens.

In recent years, the technology of projection at an ultra-short focus has emerged along with the development of the projection technology so that the projection device can project a large image over a short projection distance. As a result, the projection device can be applied to entertainment at home. The projection device is typically moved very often in this application scenario, and the image may be deformed due to projection at the ultra-short focus, so the image projected by the projection device has to be debugged frequently. At present the projection device has to be debugged by a user adjusting manually the image projected by the projection device to overlap completely with the screen. It may take a long period of time to adjust manually the image, which may not be adjusted accurately.

SUMMARY

This section provides a general summary of the disclosure, and is not a comprehensive disclosure of its full scope or all of its features.

An embodiment of the disclosure provides a device, including:

a projection device configured to:

transmit, to each zone in a projection range, positional information corresponding to the zone;

receive position identifiers, transmitted fed back by recognition devices located in space round a projection screen, the position identifiers determined by the recognition devices according to the positional information transmitted by the projection device; and adjust the projection range according to the position identifiers transmitted by the recognition devices.

An embodiment of the disclosure provides a system for adjusting a projected image, the system including:

a projection device; and a number of recognition devices located in space round a projection screen, wherein:

the projection device is configured:

to transmit, to each zone in a projection range, positional information corresponding to the zone;

to receive position identifiers, transmitted by recognition devices, the position identifiers determined by the recognition devices according to the positional information transmitted by the projection device; and to adjust the projection range according to the position identifiers transmitted by the recognition devices; and the recognition devices are configured to recognize the positional information, transmitted by the projection device in each zone of the projection range, corresponding to the zone, to determine the position identifiers from the recognized positional information, and to transmit the determined position identifiers to the projection device.

An embodiment of the disclosure provides a method for adjusting a projected image, the method including:

transmitting, by a projection device, to each zone in a projection range, positional information corresponding to the zone;

receiving, by the projection device, position identifiers, transmitted by recognition devices located in space round a projection screen, the position identifiers determined by the recognition devices according to the positional information transmitted by the projection device; and adjusting, by the projection device, the projection range according to the position identifiers transmitted by the recognition devices.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

A projection device according to an embodiment of the disclosure transmits, to each zone in a projection range, positional information corresponding to the zone; the projection device receives a position identifier, fed back by an recognition device, determined from recognized positional information of the recognition device relative to the projection range, where the recognition device is located in space round a projection screen; and the projection device adjusts the projection range according to the position identifier fed back by the recognition device so that the adjusted projection range overlaps with the projection screen. Since adjustment parameters enabling an image projected by the projection device to overlap with the projection screen can be obtained automatically in the embodiment of the disclosure, the projection device can be adjusted automatically to thereby improve the adjustment speed and the adjustment accuracy.

Figure 1A:
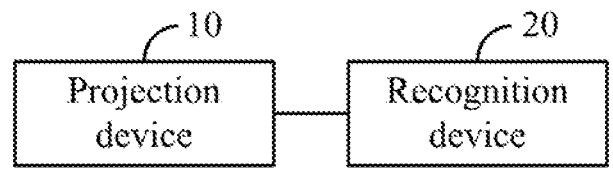
FIG. 1A is a schematic structural diagram of a system for adjusting a projected image according to an embodiment of the disclosure.
Figure 1B:
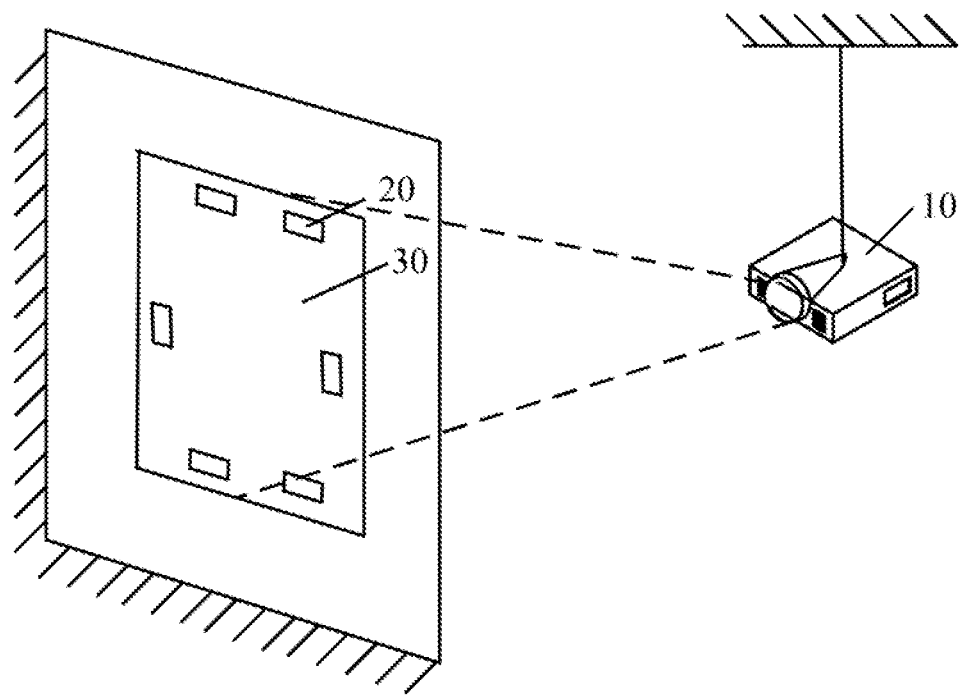
FIG. 1B is a schematic diagram of the system for adjusting a projected image according to the embodiment of the disclosure in operation.

As illustrated in FIG. 1A, a system for adjusting a projected image according to an embodiment of the disclosure includes a projection device 10, and a number of recognition devices 20 located in space round a projection screen 30. FIG. 1B illustrates a schematic diagram of the system for adjusting a projected image according to the embodiment of the disclosure in operation.

The projection device 10 is configured to transmit, to each zone in a projection range, positional information corresponding to the zone; to receive position identifiers, fed back by the recognition devices 20, determined from recognized positional information of the recognition devices 20 relative to the projection range, where the projection range is a range corresponding to an image projected by the projection device 10 onto a plane of the projection screen 30; and to adjust the projection range according to the position identifiers fed back by the recognition devices so that the adjusted projection range overlaps with the projection screen 30.

The recognition devices 20 are configured to recognize the positional information, transmitted by the projection device 10 in each zone of the projection range, corresponding to the zone; to determine the positional identifiers from the recognized positional information; and to return the determined position identifiers to the projection device 10.

In the embodiment of the disclosure, the projection range is segmented equally into a number of zones, the number of which can be preset on the projection device 10. Theoretically it will be better if the projection range is divided into a larger number of zones because if the projection range is divided into a larger number of zones, then each position identifier will represent a smaller zone, a position represented by the corresponding position identifier will be more accurate, and the projection range will be adjusted more accurately according to the position identifier. Accordingly since the recognition devices 20 recognize positional information of at least one zone and further determine the position identifier from the positional information in the embodiment of the disclosure, the zone will be smaller, and also higher recognition accuracy of the recognition devices 20 will be required.

To each of the zones into which the projection range is segmented, the positional information corresponding to the zone is transmitted by the projection device 10. The positional information can be a picture, or can be an infrared position identification code. If the positional information is an infrared position identification code, then the positional identifier will be included in numerals of the infrared position identification code; and if the positional information is a picture, then the contents of the picture can be the position identifier, or can be image information corresponding to the position identifier. The position identifier represents the position of the zone throughout the projection range, and can be consisted of two numerals, where one of the numeral represents the sequence number of the zone throughout the projection range starting from the left to the right (which can be regarded as an abscissa in a coordinate system), and the other numeral represents the sequence number of the zone throughout the projection range starting from the top to the bottom (which can be regarded as an ordinate in the coordinate system).

Figure 2:
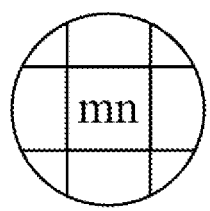
FIG. 2 is a schematic diagram of a projection range divided into zones according to an embodiment of the disclosure.

As illustrated in FIG. 2, for example, the projection range is divided into M*N (M and N are positive integers) zones. A position identifier 12 represents the position, which is in the first column and the second row, of the corresponding zone among the M*N zones in the projection range.

Here the number of the recognition devices 20 is at least four. The recognition devices 20 can recognize the positional information, determine the position identifiers from the positional information, and feed the position identifiers back to the projection device, in one of the following modes without any limitation thereto:

Bluetooth, infrared, and Wireless Fidelity (Wi-Fi).

In an implementation, the positional information can be in a number of particular forms, and different positional information will be described below in details.

In a first form, the positional information is a picture representing the position identifier.

The recognition device 20 recognizes from a position image projected by the projection device 10 into the projection range the position identifiers of the zones, where the position image includes a number of zones, each of which includes the position identifier of the zone.

In a real application, the position image projected by the projection device 10 is divided into a number of zones, in each of which the image is numerals of the position identifier. The recognition device 20 receives the image of a zone through a camera, and recognizes the numerals, which represent the position identifier, in the image through an image recognition module.

For example, the position image projected by the projection device 10 includes four zones in which there are position identifiers 11, 12, 13 and 14 respectively. The recognition device 20 can recognize a picture of the position identifier 11 in one of the zones through receiving the picture by the camera, and the image recognition module in the recognition device 20 determines the position identifier 11 from the picture, and then transmits the position identifier 11 to the projection device 10 in a Bluetooth communication mode.

In a second form, the positional information is image information corresponding to the position identifier.

The recognition device 20 recognizes from a position image projected by the projection device 10 into the projection range the image information corresponding to the position identifiers of the zones, where the position image includes a number of zones, each of which includes the position identifier of the zone.

In a real application, the position image projected by the projection device 10 is divided into a number of zones, in each of which the image information corresponds to the position identifier. A user enters in advance into the recognition device 20 the projected image information of all the zones, and a correspondence relationship between the image information and the position identifiers. The projection device 10 transmits the position image onto the recognition device 20, and the recognition device 20 checks the received image information against the image information of all the zones, which is entered in advance, and determines the position identifier of the zone corresponding to the received image information as a result of the check.

For example, the projection device 10 transmits a position image to the recognition device 20. The picture includes four zones. Position identifiers of these four zones are 11, 12, 21 and 22 respectively. A correspondence relationship between the position image and the position identifier is entered in advance into the recognition device 20, where 11 corresponds to a triangle, 12 corresponds to a circle, 21 corresponds to a square, and 22 corresponds to a diamond. The recognition device 20 recognizes a position image "Square" through the image recognition module, checks it with the image information entered in advance into the recognition device 20, and determines that the "Square" image information corresponds to the position identifier 21. Thus the recognition device 20 determines the received position identifier as 21, and sends the position identifier 21 to the projection device 10 in a Bluetooth communication mode (or another communication mode).

In a third form, the positional information is an infrared position identification code.

The recognition device 20 receives the infrared position identification code, transmitted by the projection device 10 to each zone in the projection range, of the zone.

An infrared transmitter on the projection device 10 transmits sequentially to each zone of the projection range the infrared position identification code corresponding to the zone, and the recognition device 20 receives the infrared position identification code of the zone using an infrared sensor, demodulates the infrared position identification code for the position identifier through a demodulation module, and transmits the infrared position identification code to the projection device 10 upon determining that the position identifier is valid.

Here the infrared position identification code is an infrared code including the position identifier. The number of infrared transmitter may be one or more. First several numerals in the information for which the infrared position identification code is demodulated can be a verification code followed by the position identifier. In order to prevent interference from another infrared remote control device, the first several numerals in the infrared position identification code are used as the verification code, and the following numerals will be used as the position identifier only if the first several numerals in the infrared position identification code are equal to a preset verification code.

For example, the projection device 10 transmits an infrared position identification code carrying the position identifier 11 to the zone in the first row and the first column, and an infrared position identification code carrying the position identifier 22 to the area in the second row and the second column, respectively in the projection range. The recognition device 20 receives the infrared position identification code, and determines that the signal includes the position identifier 11, through the demodulation module. Then the recognition device 20 feeds back an infrared signal carrying the position identifier 11.

Since the infrared position identification code can identify the position more accurately, the projection range can be divided into smaller zones (up to a level of pixels). Thus there will be higher adjustment accuracy in the adjusting method using the infrared position identification code as the positional information.

Figure 3:
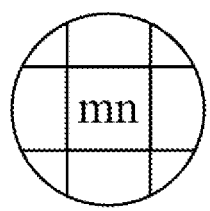
FIG. 3 is a schematic deployment diagram of an recognition device according to an embodiment of the disclosure.
Figure 4:
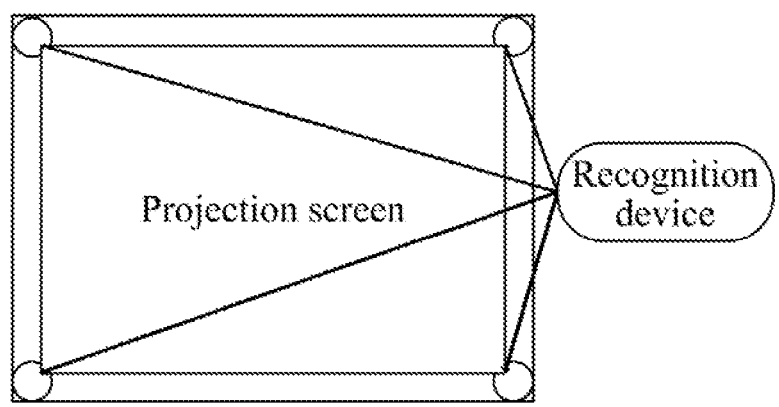
FIG. 4 is a schematic diagram of the recognition device according to the embodiment of the disclosure located at four corners in space round a projection screen.
Figure 5:
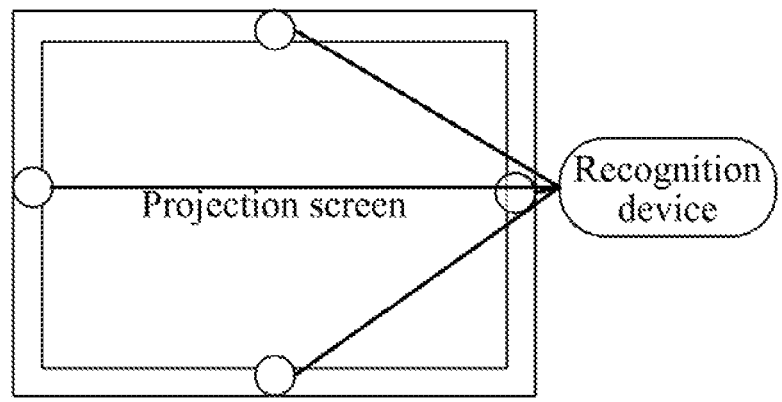
FIG. 5 is a schematic diagram of the recognition device according to the embodiment of the disclosure located at other positions of the projection screen.

The recognition devices 20 in the embodiment of the disclosure can recognize the positional information as illustrated in FIG. 3. In an implementation, a number of recognition devices 20 can be arranged on in space round the projection screen 30. As illustrated in FIG. 4, for example, one recognition device 20 can be arranged at each of four corners in space round the projection screen 30; or one recognition device 20 can be arranged at the middle point of each of four sides of the projection screen 30, particularly as illustrated in FIG. 5.

Of course, the number of recognition devices 20 to be arranged, and the positions of the respective recognition devices 20 can be set as needed, as long as the projection device 10 can adjust the projection range according to the position identifiers returned by the recognition devices 20.

One recognition device 20 receiving a position identifier can recognize positional information corresponding to one zone, and determine one position identifier.

In an implementation, if the positional information is a picture, then the recognition devices 20 may recognize a number of pieces of positional information.

If the recognition device 20 recognizes a piece of positional information, then the recognition device 20 will determine a position identifier from the positional information.

If the recognition device 20 recognizes a number of pieces of positional information, then the recognition device 20 will obtain a position identifier corresponding to each piece of position information respectively according to a correspondence relationship between the position information and the position identifier, and determines one of the determined position identifiers to be reported.

Optionally after the recognition device 20 determines the position identifier(s) from the recognized positional information, and before the recognition device 20 returns the determined position identifier(s) to the projection device 10, if the recognition device 20 determines a number of position identifiers, then the recognition device will determine one of the determined position identifiers to be reported.

The recognition devices 20 according to the embodiment of the disclosure can determine one of the determined position identifiers to be reported, in a number of schemes. Since the recognition devices 20 are configured to recognize the zones of the projection range corresponding to the projection screen 30, if there are a number of candidate position identifiers, then one of the position identifiers will be selected differently so that there will be some minor difference between the size of the recognition zone and the real size of the projection screen 30 (the recognized zone is magnified or shrunk relative to the projection screen). The schemes in which the recognition devices 20 select one of the position identifiers can be categorized dependent upon an influence thereof upon the overall recognized area surrounded by the recognition devices 20.

Several schemes to select one of the position identifiers will be listed below.

In a first scheme, one of the position identifiers is selected by shrinking the recognized zone.

In the first scheme, one of the recognized position identifiers is selected as a position identifier inside the recognized zone.

For example, if the recognition device 1 recognizes two position identifiers, the zones of which are adjacent in the row direction, then the position identifier of the right zone will be selected; and if the recognition device 2 recognizes two position identifiers, the zones of which are adjacent in the row direction, then the position identifier of the left zone will be selected.

A particular selection scheme will be exemplified below.

As illustrated in FIG. 4, the recognition device 20 on the top-left corner is the recognition device 1, and the other three recognition devices 20 in the counter clock direction are the recognition device 2, the recognition device 3, and the recognition device 4 respectively.

If the recognition devices 20 receive position identifiers of two zones, which are $n_1m_1$ and $n_2m_2$, then since these two points are adjacent, there will be $n_1=n_2$ or $m_1=m_2$. The recognition devices 20 determine one of the position identifiers to be reported, as nm.

If $n_1=n_2$, then m=MAX $\{m_1, m_2\}$ will be selected for the recognition devices 1 and 4; and m=MIN $\{m_1, m_2\}$ will be selected for the recognition devices 2 and 3.

If $m_1=m_2$, then n=MAX $\{n_1, n_2\}$ will be selected for the recognition devices 1 and 4; and n=MIN $\{n_1, n_2\}$ will be selected for the recognition devices 2 and 3.

For example, if the recognition device 1 receives the two position identifiers 12 and 22, then the recognition device 1 will recognize the position identifier 22 as a result. If the recognition device 2 recognizes the two position identifiers above, then the recognition device 2 will determine one of the position identifiers to be reported, as 12.

Since all the position identifiers selected by the respective recognition devices 20 lie in the real recognized zones, the area consisted of the position identifiers recognized by the recognition devices 20 will be shrunk in this selection scheme.

In a second scheme, one of the position identifiers is selected by magnifying the recognized zone.

In the second scheme, one of the recognized position identifiers is selected as a position identifier outside the recognized zone.

As illustrated in FIG. 4, for example, if the recognition device 1 recognizes two position identifiers, the zones of which are adjacent in the row direction, then the position identifier of the upper zone will be selected; and if the recognition device 3 recognizes two position identifiers, the zones of which are adjacent in the row direction, then the position identifier of the right zone will be selected.

A particular selection scheme will be exemplified below.

As illustrated in FIG. 4, the recognition device 20 on the top-left corner is the recognition device 1, and the other three recognition devices 20 in the counter clock direction are the recognition device 2, the recognition device 3, and the recognition device 4 respectively.

Figure 6:
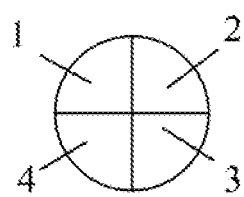
FIG. 6 is a schematic diagram of information about the four positions recognized by the recognition device according to the embodiment of the disclosure.

As illustrated in FIG. 6, if the recognition devices 20 can receive four zones, where a position identifier of the zone 1 is $n_1m_1$, a position identifier of the zone 2 is $n_2m_2$, a position identifier of the zone 3 is $n_3m_3$, and a position identifier of the zone 4 is $n_4m_4$, then the recognition devices 20 will determine one of the position identifiers to be reported, as nm.

n=MIN$\{n1, n2, n3, n4\}$ and m=MIN $\{m1, m2, m3, m4\}$ are selected for the recognition device 1;

n=MAX$\{n1, n2, n3, n4\}$ and m=MIN $\{m1, m2, m3, m4\}$ are selected for the recognition device 2;

n=MAX$\{n1, n2, n3, n4\}$ and m=MAX $\{m1, m2, m3, m4\}$ are selected for the recognition device 3; and n=MIN$\{n1, n2, n3, n4\}$ and m=MAX $\{m1, m2, m3, m4\}$ are selected for the recognition device 4.

Since all the position identifiers selected by the respective recognition devices 20 lie out of the real recognized zones, the zones recognized by the recognition devices 20 will be magnified in this selection scheme. In the selecting method where the recognized zones are magnified, the detected image range can be magnified as large as possible, and a loss of the quality of image due to the image being shrunk subsequently using the zooming function can be alleviated.

In a third scheme, one of the position identifiers is selected as follows.

In the third scheme, the recognition devices 20 can select one of the recognized position identifiers by selecting one of the recognized position identifiers randomly or at a preset position. The user can preset the position of the zone of selected one of the recognized position identifiers. In the embodiment of the disclosure, the particular position can be preset as needed, e.g., one of position identifiers of the inside, left, right, etc., zone.

For example, if the position is preset as the left, then the user can preset that a position identifier of the left zone is selected if zones of two position identifiers are adjacent in the row direction. The recognition devices 20 recognize two position identifiers $n_1m_1$ and $n_2m_2$. Zones corresponding to the two position identifiers are adjacent in the row direction, where the position identifier of the left zone is $n_1m_1$, and the position identifier of the right zone is $n_2m_2$. The recognition devices 20 select the position identifier $n_1m_1$.

After the recognition devices 20 recognize the position identifiers of the projection zones where they reside, they feed the position identifiers back to the projection device 10.

The projection device 10 receiving the position identifiers which are fed back can determine the zones where the recognition devices 20 currently reside, and adjust the projection range of the projection device 10 according to these position identifiers.

A particular adjustment process will be introduced below.

Optionally after the projection device 10 receives the position identifiers fed back by the recognition devices 20, and before the projection device 10 adjusts the projection range according to the position identifiers fed back by the recognition devices 20, the projection device 10 determines that the position identifiers fed back by all the recognition devices 20 are received.

The recognition devices 20 in the embodiment of the disclosure will feed back the position identifiers only if the position identifiers are received. If the projection device 10 has not received the position identifiers fed back by the recognition devices 20, or has received the position identifiers fed back by a part of the recognition devices 20, in a preset length of time since the position identifiers are transmitted, then the projection device 10 will determine that some recognition devices 20 have not recognized the position identifiers.

Figure 7:
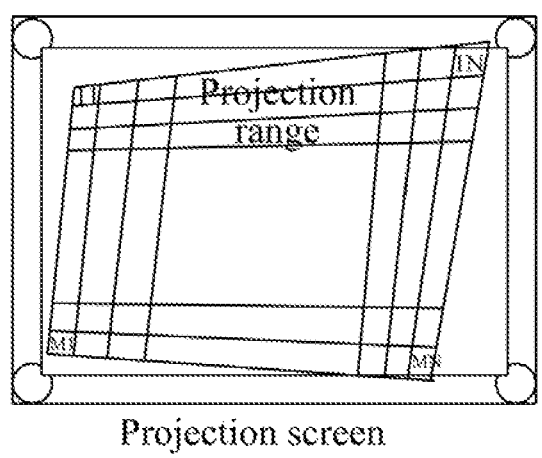
FIG. 7 is a schematic diagram of the recognition device according to the embodiment of the disclosure located outside of the projection range.

In FIG. 7, for example, since the recognition devices 20 lie out of the projection range of the projection device 10, they cannot recognize the position identifiers.

If the projection device 10 determines that not all the recognition devices 20 have fed back the position identifiers, then the projection device 10 will magnify the projection range, and return to the step in which the projection device 10 transmits to each zone in the projection range a position identifier representing the position of the corresponding zone.

If the projection device 10 has not received the position identifiers fed back by all the recognition devices 20, then it will mean that there is a recognition device(s) 20 out of the projection range, that is, the projection screen 30 is not included completely in the projection range. Thus the projection device 10 shall magnify the projection range until the projection screen 30 is included in the projection range. While the projection range is being magnified, the projection device 10 transmits position identifiers to the recognition devices 20 dynamically without any interruption, and the recognition devices 20 also feed back the position identifiers without any interruption. The projection device 10 can ascertain whether the projection screen 30 has been included in the projection range, while magnifying the projection range. If not, then the projection range will be further magnified; otherwise, the projection range will be stopped from being magnified, and the flow will proceed to the next step in which the projection range is adjusted.

Optionally there are four recognition devices at four corners respectively in space round the rectangular projection screen 30; and The projection device 10 adjusts the projection range into a rectangle according to the positions of the recognition devices 20, and the position identifiers fed back by the recognition devices 20 as follows:

Row-wise compensation quantities corresponding to the respective recognition devices are determined respectively according to abscissas of the respective position identifiers, the positions of the respective recognition devices 20, and the size of the projection screen 30; and column-wise compensation quantities corresponding to the respective recognition devices 20 are determined respectively according to ordinates of the respective position identifiers, the positions of the respective recognition devices 20, and the size of the projection screen 30; and The projection range is adjusted into the rectangle according to the row-wise compensation quantities and the column-wise compensation quantities corresponding to the respective recognition devices.

The projection device 10 in the embodiment of the disclosure can adjust the projection range into the rectangle according to the position identifiers; and after the projection range is adjusted, the projection device 10 can further transmit position identifiers to the adjusted projection ranges, and adjust the aspect ratio of the projection range to be the same as the projection screen 30, according to the position identifiers which are fed back. A particular implementation thereof will be given below.

There are four recognition devices 20, which are located on four corners in space round the projection screen, where the recognition device 1 is located on the top-left corner, and the other three recognition devices 2, 3 and 4 respectively are located in the counter clock direction; and the projection range is divided into M*N zones. The recognition device 1 recognizes a zone of D1 according to a position identifier, and the same will apply to the other recognition devices 20. The length of the projection screen 30 is L, and the width thereof is W, both of which can be entered manually. A method for adjusting the projection range will be introduced below in details in the following three steps.

In the first step, the projection range is adjusted into a rectangle.

Figure 8:
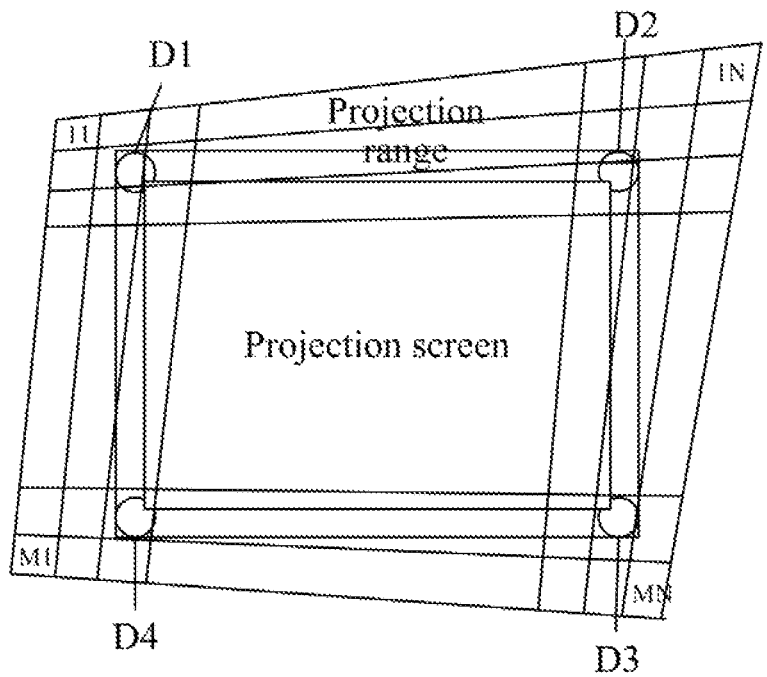
FIG. 8 is a schematic diagram of the projection range according to the embodiment of the disclosure which is not a rectangle.

As illustrated in FIG. 8, the projection range is not a rectangle. The zones identified by the four devices according to the position identifiers are $D1=n_1m_1$, $D2=n_2m_2$, $D3=n_3m_3$, and $D4=n_4m_4$, where $n_1m_1$ represents that the zone identified by the recognition device 20 is in the n1-th column and the m1-th row among the zones into which the projection range is divided. Since each position identifier corresponds to a small zone in a real application, the zone can be regarded hereinafter as a dot for the sake of a convenient description. With $D1=n_1m_1$, n1 can be regarded as the abscissa of the zone identified by D1, and m1 can be regarded as the ordinate thereof.

Distances over which these four zones (which can be regarded as four dots because they are very small for the sake of accurate adjustment) shall be adjusted in the row-wise direction and the column-wise direction are determined, which will be referred hereinafter to as adjustment quantities. A positive row-wise adjustment quantity represents rightward adjustment, and a negative row-wise adjustment quantity represents leftward adjustment; and a positive column-wise adjustment quantity represents downward adjustment, and a negative column-wise adjustment quantity represents upward adjustment.

Let n=MIN $\{n_1, n_4, (N-n_2), (N-n_3)\}$; and m=MIN $\{m_1, m_2, (M-m_3), (M-m_4)\}$.

Column-wise downward adjustment is positive, and upward adjustment is negative.

Let n=MIN $\{n_1, n_4, (N-n_2), (N-n_3)\}$; and m=MIN $\{m_1, m_z, (M-m_3), (M-m_4)\}$.

Column-wise downward adjustment is positive, and upward adjustment is negative.

A row-wise adjustment quantity for D1 is $$H_{d1} = (n_1 - n)\left(\frac{W}{N} + \Delta_H\right);$$

A column-wise adjustment quantity for D1 is $$V_{d1} = (m_1 - m)\left(\frac{L}{M} + \Delta_V\right);$$

A row-wise adjustment quantity for D2 is $$H_{d2} = -(N - n_2 - n)\left(\frac{W}{N} + \Delta'_H\right);$$

A column-wise adjustment quantity for D2 is $$V_{d2} = (m_2 - m)\left(\frac{L}{M} + \Delta'_V\right);$$

A row-wise adjustment quantity for D3 is $$H_{d3} = -(N - n_3 - n)\left(\frac{W}{N} + \Delta'_H\right);$$

A column-wise adjustment quantity for D3 is $$V_{d3} = -(M - m_3 - m)\left(\frac{L}{M} + \Delta'_V\right);$$

A row-wise adjustment quantity for D4 is $$H_{d4} = (n_4 - n)\left(\frac{W}{N} + \Delta_H\right);$$

A column-wise adjustment quantity for D4 is $$V_{d4} = -(M - m_4 - m)\left(\frac{L}{M} + \Delta'_V\right).$$

Where $\Delta_H$ and $\Delta'_H$ represent row-wise compensation factors, and $\Delta_V$ and $\Delta'_V$ represent column-wise compensation factors, all of which are configured to compensate for the real adjustment quantities being insufficient due to the deformation of the projection screen 30. The respective compensation factors are calculated as follows:

$$\Delta_H = \frac{W}{n_2 - n_1} - \frac{W}{N}, \Delta'_H = \frac{W}{n_3 - n_4} - \frac{W}{N}; \text{ and}$$

$$\Delta_V = \frac{L}{m_4 - m_1} - \frac{L}{M}, \Delta'_V = \frac{L}{m_3 - m_2} - \frac{L}{M}.$$

The projection device 10 according to the embodiment of the disclosure can adjust the projection range into the rectangle using a geometric adjustment function according to the values of the parameters above.

In the second step, the aspect ratio of the projection range is adjusted to the same as the projection screen 30.

After the projection range is adjusted in the first step, the projection device 10 transmits position identifiers to the new projection range. The four recognition devices 20 can read the updated position identifiers, and at this time the recognition devices 20 receiving the information can recognize zones numbered as $D'1 = n'_1 m'_1$, $D'2 = n'_2 m'_1$, $D'3 = n'_2 m'_2$, and $D'4 = n'_1 m'_2$.

Firstly a row-wise side or a column-wise side to be adjusted is determined as required.

If $$\frac{n'_2 - n'_1}{m'_2 - m'_1} < \frac{W}{L},$$

then a column-wise side will be adjusted; if $$\frac{n'_2 - n'_1}{m'_2 - m'_1} = \frac{W}{L},$$

then no side will be adjusted; and if $$\frac{n'_2 - n'_1}{m'_2 - m'_1} > \frac{W}{L},$$

then a row-wise side will be adjusted.

If a column-wise side is adjusted, then $n = \text{MAX}\{n'_1, (N - n'_2)\}$.

If $n = n'_1$, then the left vertical line of the rectangle of the projection range will be a line to be adjusted in the positive direction; otherwise, the right vertical line thereof will be a line to be adjusted in the negative direction.

There is an adjustment quantity of $$(\pm)\phi_V = L\left[\frac{M}{(m'_2 - m'_1)} - \frac{N}{(n'_2 - n'_1)}\right].$$

If a row-wise side is adjusted, then $m = \text{MAX}\{m'_1, (M - m'_2)\}$.

If $m = m'_1$, then the upper horizontal line of the rectangle of the projection range will be a line to be adjusted in the positive direction; otherwise, the lower horizontal line thereof will be a line to be adjusted in the negative direction.

There is an adjustment quantity of $$(\pm)\phi_H = W\left[\frac{N}{(n'_2 - n'_1)} - \frac{M}{(m'_2 - m'_1)}\right].$$

The aspect ratio of the adjusted projection range is changed to the same $$\frac{W}{L}$$

as the projection screen 30.

Figure 9:
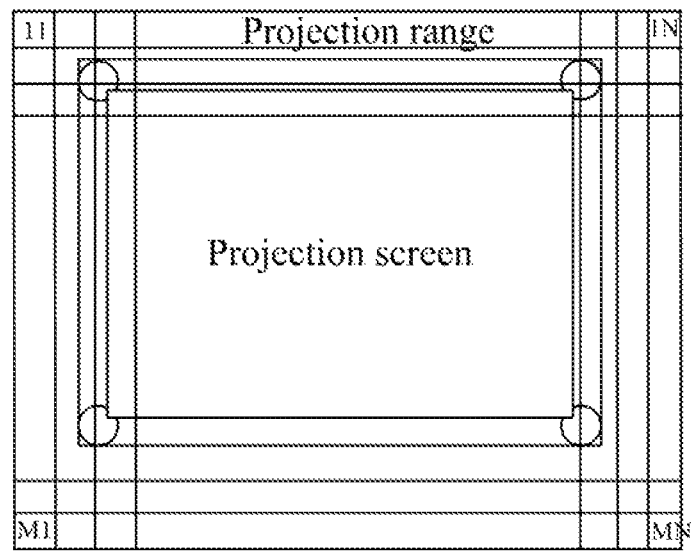
FIG. 9 is a schematic diagram of the projection range according to the embodiment of the disclosure with a different aspect ratio from the projection screen.

As illustrated in FIG. 9, for example, the projection range is a rectangle with a different aspect ratio from the projection screen 30. With the steps above, the projection range can be changed to the rectangle with the same aspect ratio as the projection screen 30.

Both the first step and the second step are performed using a geometric revision function of the projection device 10.

In the third step, the center of the projection range is made overlap with the projection screen 30.

The projection device 10 transmits position identifiers in the new projection range adjusted in the second step. The recognition devices 20 recognize the position identifiers and then feed back the updated position identifiers.

$D''1=n''_1m''_1$, $D''2=n''_2m''_1$, $D''3=n''_2m''_2$, and $D''4=n''_1m''_2$.

The image is moved horizontally and vertically so that the center of the projection range overlaps with the center of the projection screen.

Thus if the two centers overlap, then the position identifier in the projection range corresponding to the central position of the projection screen shall be $$\left(\frac{N+1}{2}, \frac{M+1}{2}\right).$$

Since both M and N are odd numbers, both $$\frac{N+1}{2} \text{ and } \frac{M+1}{2}$$

are integers.

It thus can be determined the projection range is moved horizontally over the distance of $$\left(\frac{N+1}{2} - \frac{n''_2 - n''_1}{2}\right) \times \left(\frac{W}{N} + \Delta''_H\right);$$

and

The projection range is moved vertically over the distance of $$\left(\frac{M+1}{2} - \frac{m''_2 - m''_1}{2}\right) \times \left(\frac{L}{M} + \Delta''_V\right).$$

Where $\Delta''_H$ and $\Delta''_V$ represent compensation quantities:

$$\Delta''_H = \frac{W}{n''_2 - n''_1} - \frac{W}{N}, \Delta''_V = \frac{W}{m''_2 - m''_1} - \frac{L}{M}.$$

Figure 10:
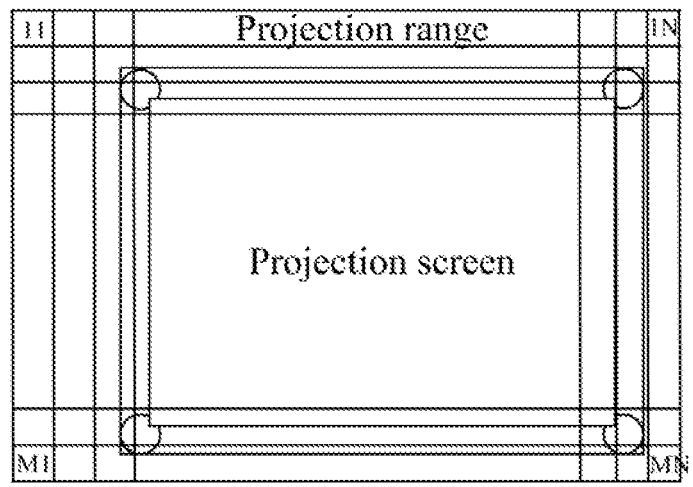
FIG. 10 is a schematic diagram of the projection range according to the embodiment of the disclosure, the center of which does not overlap with the projection screen.

As illustrated in FIG. 10, for example, the center of the projection range does not overlap with the projection screen 30, and the projection range can be adjusted according to the data above so that their centers overlap.

This step can be performed using a shift function of the projection device 10. The shift projection can translate the projection range without changing the shape and the size of the projection range.

The aspect ratio of the adjusted projection range agrees with that of the projection screen 30, and they have the same center.

In the fourth step, the projection range is shrunk so that the projection range overlaps completely with the projection screen 30.

The projection device transmits position identifiers to the projection range and reads the position identifiers which are fed back, without any interruption while shrinking the projection range. The projection device 10 can adjust consecutively a magnification factor of the projection device through an internal mechanical structure (e.g., a motor), and the projection device 10 can transmit the position identifiers, and accept the position identifiers which are fed back, very soon as compared with the speed at which the projection range is magnified or shrunk, so it can be substantially considered that the position identifiers received by the projection device 10, which are fed back, are varying consecutively. Thus the projection device 10 can shrink or magnify consecutively the projection range according to the received position identifiers so that the projection range will overlap with the projection screen 30.

If the projection range is divided into M*N zones until D1=11, D2=1N, D3=M1, and D4=MN, then the adjustment will be finished so that the image overlaps completely with the projection screen 30.

This step can be performed using the zoom function of the projection device 10.

The four adjustment steps above relate to a particular adjustment scheme but can be modified as required in a real application.

Figure 11:
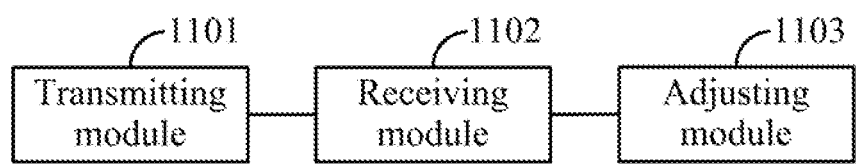
FIG. 11 is a schematic diagram of a projection device according to an embodiment of the disclosure.

As illustrated in FIG. 11, an embodiment of the disclosure provides a projection device including:

A transmitting module 1101 is configured to transmit, to each zone in a projection range, positional information corresponding to the zone;

A receiving module 1102 is configured to receive position identifiers, fed back by recognition devices, determined from recognized positional information of the recognition devices relative to the projection range, where the recognition devices are located in space round a projection screen; and An adjusting module 1103 is configured to adjust the projection range according to the position identifiers fed back by the recognition devices so that the adjusted projection range overlaps with the projection screen.

Optionally the transmitting module 1101 is configured:

To project a position image into the projection range, where the position image includes a number of zones, each of which includes the position identifier of the zone, or image information corresponding to the position identifier of the zone; or To transmit to each zone in the projection range an infrared position identification code of the zone.

Optionally the receiving module 1102 is further configured:

To determine that the position identifiers fed back by all the recognition devices are received.

Optionally the adjusting module 1103 is further configured:

If the position identifiers fed back by all the recognition devices are not received, to magnify the projection range so that the transmitting module transmits to each zone in the projection range a position identifier representing the position of the corresponding zone.

Optionally the projection screen is a rectangle, and the adjusting module 1103 is configured:

To adjust the projection range to the rectangle according to the positions of the recognition devices, and the position identifiers fed back by the recognition devices; to adjust an aspect ratio of the projection range to the same aspect ratio as the projection screen; to move the projection range so that the center of the moved projection range overlaps with the center of the projection screen; and to shrink the projection range so that the shrunk projection range overlaps with the projection screen.

Optionally there are four recognition devices at four corners respectively in space round the rectangular projection screen; and The adjusting module 1103 is configured:

To determine row-wise compensation quantities corresponding to the respective recognition devices respectively according to abscissas of the respective position identifiers, the positions of the respective recognition devices, and the size of the projection screen; and to determine column-wise compensation quantities corresponding to the respective recognition devices respectively according to ordinates of the respective position identifiers, the positions of the respective recognition devices, and the size of the projection screen; and To adjust the projection range to the rectangle according to the row-wise compensation quantities and the column-wise compensation quantities corresponding to the respective recognition devices.

Optionally the adjusting module 1103 is configured:

To shrink the projection range;

To transmit to each zone in the projection range a position identifier representing the position of the corresponding zone;

To determine according to the position identifiers fed back by the recognition devices whether the shrunk projection range overlaps with the projection screen; and If the shrunk projection range does not overlap with the projection screen, then to return to the step of adjusting the projection range of the projection device.

Figure 12:
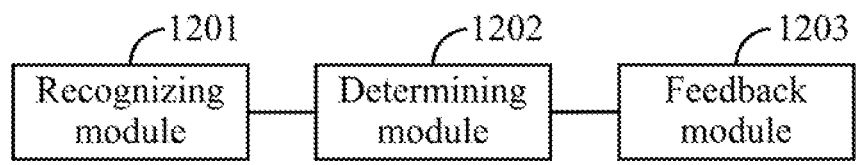
FIG. 12 is a schematic diagram of an recognition device according to an embodiment of the disclosure.

As illustrated in FIG. 12, an embodiment of the disclosure provides a recognition device including:

A recognizing module 1201 is configured to recognize positional information, transmitted by a projection device in each zone of a projection range, corresponding to the zone, where the recognition device is located in space round a projection screen;

A determining module 1202 is configured to determine a position identifier from the recognized positional information; and A feedback module 1203 is configured to return the determined position identifier to the projection device so that the projection device adjusts the projection range according to the position identifier.

Optionally the recognizing module 1201 is configured:

To recognize the position identifier of the zone from a position image projected by the projection device into the projection range, or image information corresponding to the position identifier of the zone, where the position image includes a number of zones, each of which includes the position identifier of the zone, or image information corresponding to the position identifier of the zone; or To receive an infrared position identification code, transmitted by the projection device to each zone in the projection range, of the zone.

Optionally the determining module 1202 is configured:

If the position identifier of the zone is recognized from the position image projected by the projection device into the projection range, to determine the recognized position identifier as the determined position identifier;

If the image information corresponding to the position identifier of the zone is recognized from the position image projected by the projection device into the projection range, to determine the position identifier corresponding to the recognized image information according to a correspondence relationship between the image information and the position identifier; and If the infrared position identification code, transmitted by the projection device into each zone of the projection range, of the zone, to determine the received infrared position identification code as the determined position identifier.

Optionally the determining module 1202 is further configured:

If a number of position identifiers are determined, to determine one of the determined position identifiers to be reported.

Based upon the same inventive idea, embodiments of the disclosure further provide methods for adjusting a projected image, and since devices corresponding to the methods are the devices in the system according to the embodiment of the disclosure, and this methods address the problem under a similar principle to the system according to the embodiment of the disclosure, reference can be made to the implementation of the system for implementations of the methods, so a repeated description thereof will be omitted here.

Figure 13:
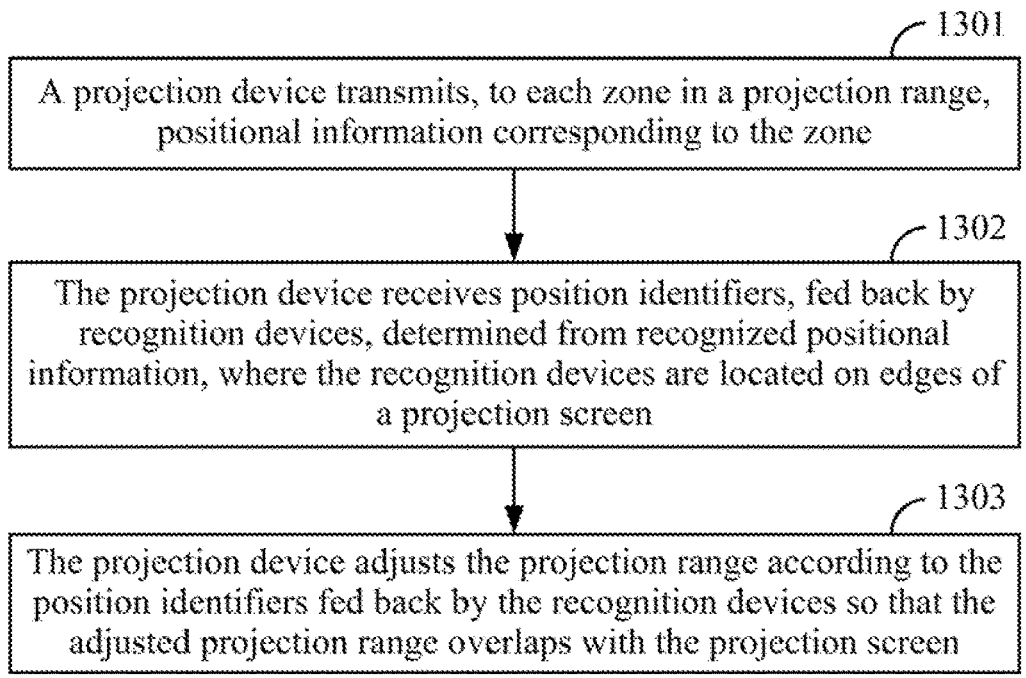
FIG. 13 is a schematic flow chart of a first method for adjusting a projected image according to an embodiment of the disclosure.

As illustrated in FIG. 13, an embodiment of the disclosure provides a method for adjusting a projected image, the method including:

In the step 1301, a projection device transmits, to each zone in a projection range, positional information corresponding to the zone;

In the step 1302, the projection device receives position identifiers, fed back by recognition devices, determined from recognized positional information of the recognition devices relative to the projection range, where the recognition devices are located in space round a projection screen; and In the step 1303, the projection device adjusts the projection range according to the position identifiers fed back by the recognition devices so that the adjusted projection range overlaps with the projection screen.

Optionally the projection device transmitting, to each zone in the projection range, the positional information corresponding to the zone includes:

The projection device projects a position image into the projection range, where the position image includes a number of zones, each of which includes the position identifier of the zone, or image information corresponding to the position identifier of the zone; or The projection device transmits to each zone in the projection range an infrared position identification code of the zone.

Optionally after the projection device receives the position identifiers fed back by the recognition devices, and before the projection device adjusts the projection range according to the position devices fed back by the recognition devices, the method further includes:

The projection device determines that position identifiers fed back by at least four recognition devices are received.

Optionally after the projection device receives the position identifiers fed back by the recognition devices, the method further includes:

If the position identifiers fed back by all the recognition devices are not received, then the projection device magnifies the projection range, and returns to the step in which the projection device transmits to each zone in the projection range a position identifier representing the position of the corresponding zone.

Optionally the projection screen is a rectangle, and the projection device adjusting the projection range according to the position identifiers fed back by the recognition devices so that the adjusted projection range overlaps with the projection screen includes:

The projection screen adjusts the projection range to the rectangle according to the positions of the recognition devices, and the position identifiers fed back by the recognition devices;

The projection screen adjusts an aspect ratio of the projection range to the same aspect ratio as the projection screen;

The projection screen moves the projection range so that the center of the moved projection range overlaps with the center of the projection screen; and The projection screen shrinks the projection range so that the shrunk projection range overlaps with the projection screen.

Optionally there are four recognition devices at four corners respectively in space round the rectangular projection screen; and The projection screen adjusting the projection range to the rectangle according to the positions of the recognition devices, and the position identifiers fed back by the recognition devices includes:

The projection device determines row-wise compensation quantities corresponding to the respective recognition devices respectively according to abscissas of the respective position identifiers, the positions of the respective recognition devices, and the size of the projection screen;

The projection device determines column-wise compensation quantities corresponding to the respective recognition devices respectively according to ordinates of the respective position identifiers, the positions of the respective recognition devices, and the size of the projection screen; and The projection device adjusts the projection range to the rectangle according to the row-wise compensation quantities and the column-wise compensation quantities corresponding to the respective recognition devices.

Optionally the projection device adjusting the projection range so that the adjusted projection range overlaps with the projection screen comprises:

The projection device shrinks the projection range;

The projection device transmits to each zone in the projection range a position identifier representing the position of the corresponding zone;

The projection device determines according to the position identifiers fed back by the recognition devices whether the shrunk projection range overlaps with the projection screen; and If the shrunk projection range does not overlap with the projection screen, then to return to the step of adjusting the projection range of the projection device.

Figure 14:
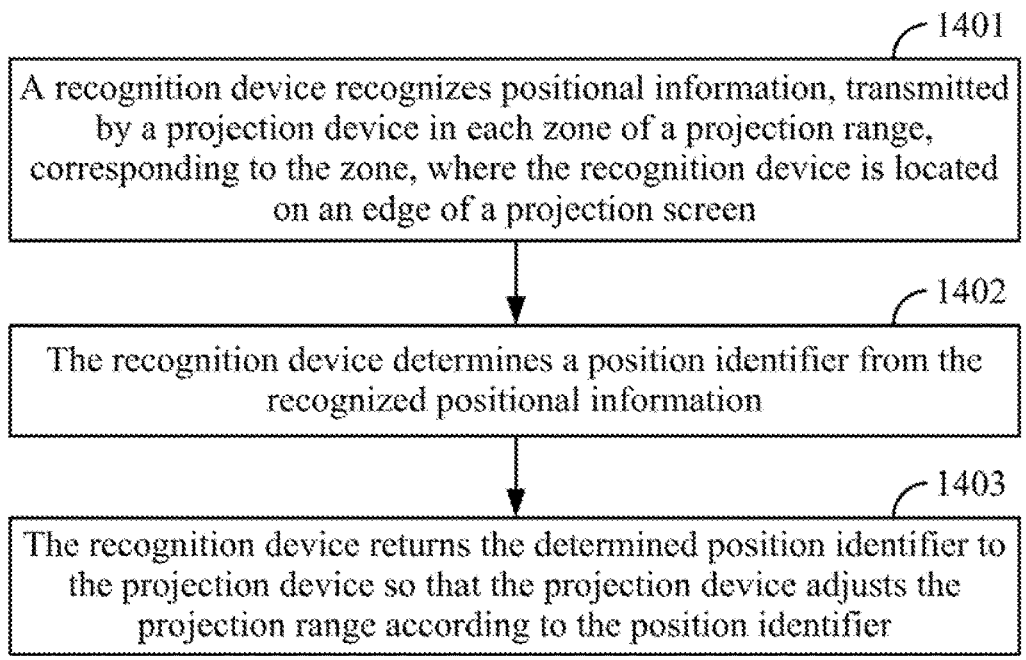
FIG. 14 is a schematic flow chart of a second method for adjusting a projected image according to an embodiment of the disclosure.

As illustrated in FIG. 14, an embodiment of the disclosure provides a method for adjusting a projected image, the method including:

In the step S1401, a recognition device recognizes positional information, transmitted by a projection device in each zone of a projection range, corresponding to the zone, where the recognition device is located in space round a projection screen;

In the step S1402, the recognition device determines a position identifier from the recognized positional information; and In the step S1403, the recognition device returns the determined position identifier to the projection device so that the projection device adjusts the projection range according to the position identifier.

Optionally the recognition device recognizing the positional information includes:

The recognition device recognizes the position identifier of the zone from a position image projected by the projection device into the projection range, or image information corresponding to the position identifier of the zone, where the position image includes a number of zones, each of which includes the position identifier of the zone, or image information corresponding to the position identifier of the zone; or The recognition device receives an infrared position identification code, transmitted by the projection device to each zone in the projection range, of the zone.

Optionally the recognition device determining the position identifier from the recognized positional information includes:

If the position identifier of the zone is recognized from the position image projected by the projection device into the projection range, to determine the recognized position identifier as the determined position identifier;

If the recognition device recognizes the image information corresponding to the position identifier of the zone from the position image projected by the projection device into the projection range, then the recognition device determines the position identifier corresponding to the recognized image information according to a correspondence relationship between the image information and the position identifier; and If the recognition device receives the infrared position identification code, transmitted by the projection device into each zone of the projection range, of the zone, then the recognition device determines the received infrared position identification code as the determined position identifier.

Optionally after the recognition device determines the position identifier according to the recognized positional information, and before the recognition device returns the determined position identifier to the projection device, then the method further includes:

If a number of position identifiers are determined, then the recognition device determines one of the determined position identifiers to be reported.

Figure 15:
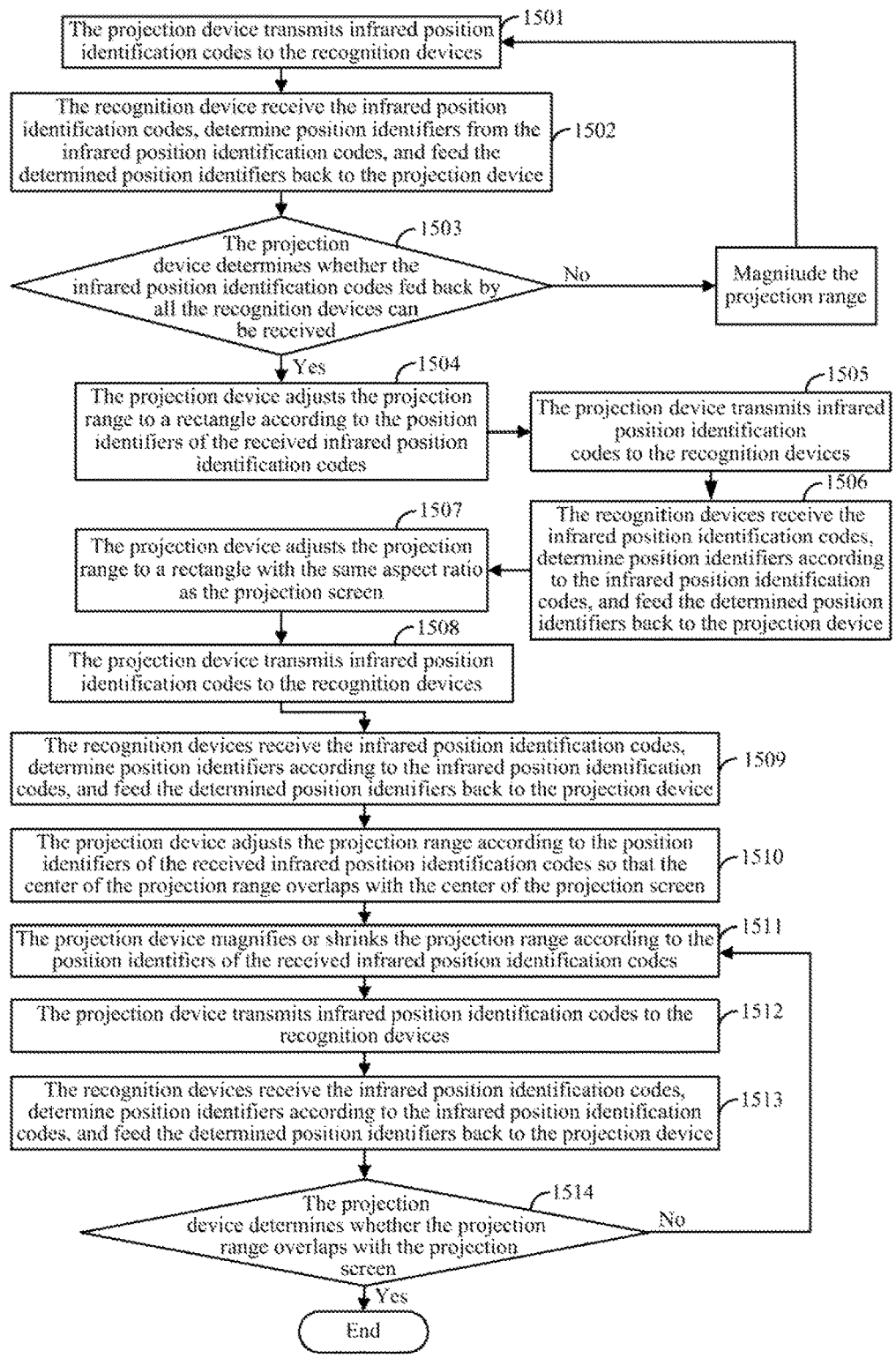
FIG. 15 is a schematic diagram of a general flow of a method for adjusting a projected image according to an embodiment of the disclosure.

As illustrated in FIG. 15, a general flow of the methods for adjusting a projected image according to the embodiments of the disclosure includes the following steps:

In the step 1501, the projection device transmits infrared position identification codes to the recognition devices;

In the step 1502, the recognition device receive the infrared position identification codes, determine position identifiers from the infrared position identification codes, and feed the determined position identifiers back to the projection device;

In the step 1503, the projection device determines whether the infrared position identification codes fed back by all the recognition devices can be received, and if so, then the flow proceeds to the step 1504; otherwise, the projection device magnifies the projection range, and the flow returns to the step 1501;

In the step 1504, the projection device adjusts the projection range to a rectangle according to the position identifiers of the received infrared position identification codes;

In the step 1505, the projection device transmits infrared position identification codes to the recognition devices;

In the step 1506, the recognition devices receive the infrared position identification codes, determine position identifiers according to the infrared position identification codes, and feed the determined position identifiers back to the projection device;

In the step 1507, the projection device adjusts the projection range to a rectangle with the same aspect ratio as the projection screen;

In the step 1508, the projection device transmits infrared position identification codes to the recognition devices;

In the step 1509, the recognition devices receive the infrared position identification codes, determine position identifiers according to the infrared position identification codes, and feed the determined position identifiers back to the projection device;

In the step 1510, the projection device adjusts the projection range according to the position identifiers of the received infrared position identification codes so that the center of the projection range overlaps with the center of the projection screen;

In the step 1511, the projection device magnifies or shrinks the projection range according to the position identifiers of the received infrared position identification codes;

In the step 1512, the projection device transmits infrared position identification codes to the recognition devices;

In the step 1513, the recognition devices receive the infrared position identification codes, determine position identifiers according to the infrared position identification codes, and feed the determined position identifiers back to the projection device; and In the step 1514, the projection device determines whether the projection range overlaps with the projection screen; and if not, then the flow returns to the step 1511; otherwise, the flow terminates the adjustment.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A projection device, comprising:
   a projection device configured to:
   transmit, to each zone in a projection range, positional information corresponding to the zone;
   receive position identifiers fed back by recognition devices located in a space around a projection screen, the position identifiers determined by the recognition devices in response to recognizing the positional information transmitted by the projection device, the projection screen defining a rectangle and the recognition devices comprising at least four recognition devices located at four corners in the space around the projection screen;
   determine row-wise compensation quantities corresponding to the recognition devices according to abscissas of the respective position identifiers, positions of the respective recognition devices, and a size of the projection screen;
   determine column-wise compensation quantities corresponding to the recognition devices according to ordinates of the respective position identifiers, the positions of the respective recognition devices, and the size of the projection screen; and
   adjust the projection range to approximately coincide with the rectangular projection screen, according to positions of the recognition devices, the position identifiers fed back by the recognition devices, the determined row-wise compensation quantities and the determined column-wise compensation quantities;
   adjust an aspect ratio of the projection range to the same aspect ratio as the projection screen;
   move the projection range so a center of the moved projection range overlaps with a center of the projection screen; and
   shrink the projection range so the shrunk projection range overlaps with the projection screen.

2. The projection device according to claim 1, wherein the projection device is configured to:
   project a position image into the projection range, wherein the position image comprises a number of zones, each of which comprises a position identifier of the zone, or image information corresponding to the position identifier of the zone; or
   transmit to each zone in the projection range an infrared position identification code of the zone.

3. The projection device according to claim 1, wherein the projection device is further configured to determine that the position identifiers fed back by all the recognition devices are received.

4. The projection device according to claim 3, wherein the projection device is further configured to, in response to determining that the position identifiers fed back by all the recognition devices are not received, magnify the projection range, and return to the process in which the projection device transmits to each zone in the projection range positional information corresponding to the zone.

5. The projection device according to claim 1, wherein the projection device is configured to:
   transmit to each zone in the shrunk projection range, the positional information corresponding to the zone;
   determine according to the position identifiers fed back by the recognition devices whether the shrunk projection range overlaps with the projection screen; and
   in response to determining that the shrunk projection range does not overlap with the projection screen, return to the process in which the projection device determines the row-wise compensation quantities.

6. A system for adjusting a projected image, the system comprising:
   a projection device; and
   a number of recognition devices located in a space around a projection screen, the projection screen defining a rectangle, wherein:
   the projection device is configured to:
   transmit, to each zone in a projection range, positional information corresponding to the zone;
   receive position identifiers fed back by the recognition devices; and
   adjust the projection range to approximately coincide with the rectangular projection screen according to positions of the recognition devices and the position identifiers fed back by the recognition devices;
   adjust an aspect ratio of the projection range to the same aspect ratio as the projection screen;
   move the projection range so a center of the moved projection range overlaps with a center of the projection screen; and
   shrink the projection range;
   transmit to each zone in the shrunk projection range the positional information corresponding to the zone;
   determine whether the shrunk projection range overlaps with the projection screen according to the position identifiers fed back by the recognition devices; and
   in response to determining that the shrunk projection range does not overlap with the projection screen, returning to the process in which the projection device adjusts the projection range;
   wherein the recognition devices are configured to recognize the positional information transmitted by the projection device to each zone in the projection range, determine the position identifiers from the recognized positional information, and feedback the determined position identifiers to the projection device.

7. The system according to claim 6, wherein the projection device is configured to transmit, to each zone in the projection range, the positional information corresponding to the zone by:
   projecting a position image into the projection range, wherein the position image comprises a number of zones, each of which comprises the position identifier of the zone, or image information corresponding to the position identifier of the zone; or
   transmitting to each zone in the projection range an infrared position identification code of the zone.

8. The system according to claim 6, wherein the recognition devices comprise at least four recognition devices located at four corners respectively in the space around the rectangular projection screen; and the projection device is further configured to adjust the projection range to the rectangle according to the positions of the recognition devices and the position identifiers fed back by the recognition devices by:
   determining row-wise compensation quantities corresponding to the respective recognition devices according to abscissas of the respective position identifiers, positions of the respective recognition devices, and a size of the projection screen;
   determining column-wise compensation quantities corresponding to the respective recognition devices according to ordinates of the respective position identifiers, positions of the respective recognition devices, and the size of the projection screen; and
   adjusting the projection range to the rectangle according to the row-wise compensation quantities and the column-wise compensation quantities corresponding to the respective recognition devices.

9. The system according to claim 6, wherein after the projection device receives the position identifiers fed back by the recognition devices, and before the projection device adjusts the projection range to approximately coincide with the rectangular projection screen according to the positions of the recognition devices and the position identifiers fed back by the recognition devices, the projection device is further configured to:
   determine that the position identifiers fed back by all the recognition devices are received; and
   in response to determining that the position identifiers fed back by all the recognition devices are not received, magnify the projection range and return to the process in which the projection device transmits to each zone in the projection range the positional information corresponding to the zone.

10. A method for adjusting a projected image, the method comprising:
   transmitting, by a projection device to each zone in a projection range, positional information corresponding to the zone;
   receiving, by the projection device, position identifiers fed back by recognition devices located in a space around a projection screen, the position identifiers determined by the recognition devices in response to recognizing the positional information transmitted by the projection device, the projection screen defining a rectangle and the recognition devices comprising at least four recognition devices located at four corners in the space around the projection screen;
   determining, by the projection device, row-wise compensation quantities corresponding to the recognition devices according to abscissas of the respective position identifiers, positions of the respective recognition devices, and a size of the projection screen;
   determining, by the projection device, column-wise compensation quantities corresponding to the recognition devices according to ordinates of the respective position identifiers, the positions of the respective recognition devices, and the size of the projection screen; and
   adjusting, by the projection device, the projection range to approximately coincide with the rectangular projection screen, according to positions of the recognition devices, the position identifiers fed back by the recognition devices, the determined row-wise compensation quantities and the determined column-wise compensation quantities;
   adjusting, by the projection device, an aspect ratio of the projection range to the same aspect ratio as the projection screen;

moving, by the projection device, the projection range so a center of the moved projection range overlaps with a center of the projection screen; and shrinking, by the projection device, the projection range so the shrunk projection range overlaps with the projection screen.

11. The method according to claim 10, wherein transmitting, by the projection device to each zone in the projection range, the positional information corresponding to the zone comprises:

projecting, by the projection device, a position image into the projection range, wherein the position image comprises a number of zones, each of which comprises the position identifier of the zone or image information corresponding to the position identifier of the zone; or transmitting, by the projection device, to each zone in the projection range an infrared position identification code of the zone.

12. The method according to claim 10, wherein after the projection device receives the position identifiers fed back by the recognition devices, and before the projection device determines the row-wise compensation quantities, the method further comprises:

determining, by the projection device, that position identifiers fed back by the at least four recognition devices are received.

13. The method according to claim 12, wherein after the projection device receives the position identifiers fed back by the recognition devices, the method further comprises:

in response to determining that the position identifiers fed back by all the recognition devices are not received, magnifying, by the projection device, the projection range, and returning to the process in which the projection device transmits to each zone in the projection range the positional information corresponding to the zone.

14. The method according to claim 10, wherein shrinking, by the projection device, the projection range so the shrunk projection range overlaps with the projection screen comprises:

shrinking, by the projection device, the projection range;

transmitting, by the projection device, to each zone in the shrunk projection range the positional information corresponding to the zone;

determining, by the projection device, the shrunk projection range according to the position identifiers fed back by the recognition devices; and in response to determining that the shrunk projection range does not overlap with the projection screen, returning to the process in which the projection device determines the row-wise compensation quantities.

15. A method for adjusting a projected image, the method comprising:

transmitting, by a projection device to each zone in the projection range, positional information corresponding to the zone;

receiving, by the projection device, position identifiers fed back by recognition devices located in a space around a protection screen, the position identifiers determined by the recognition devices in response to recognizing the positional information transmitted by the protection device, the projection screen defining a rectangle;

adjusting, by the projection device, the projection range to approximately coincide with the rectangular projection screen according to positions of the recognition devices and the position identifiers fed back by the recognition devices;

adjusting, by the projection device, an aspect ratio of the projection range to the same aspect ratio as the projection screen;

moving, by the projection device, the projection range so a center of a moved projection range overlaps with a center of the projection screen;

shrinking, by the projection device, the projection range;

transmitting, by the protection device, to each zone in the shrunk projection range the positional information corresponding to the zone;

determining, by the projection device, according to the position identifiers fed back by the recognition devices whether the shrunk projection range overlaps with the projection screen; and in response to determining that the shrunk projection range does not overlap with the projection screen, returning to the process in which the projection device adjusts the projection range.

* * * * *